United States Patent [19]

Quist et al.

[11] 4,426,467

[45] Jan. 17, 1984

[54] FOUNDRY MOLDING COMPOSITIONS AND PROCESS

[75] Inventors: Ingmar P. Quist, Llantwit Major; Jeffrey D. Railton, Shirley Warren; Peter H. R. B. Lemon, Pandale, all of England

[73] Assignee: Borden (UK) Limited, Southampton, England

[21] Appl. No.: 224,131

[22] Filed: Jan. 12, 1981

[51] Int. Cl.³ .............................................. C08K 3/36
[52] U.S. Cl. .................................... 523/145; 524/594
[58] Field of Search ........................ 523/144, 145, 146

[56] References Cited

U.S. PATENT DOCUMENTS

| | | | |
|---|---|---|---|
| 3,189,566 | 6/1965 | Shinjo | 523/145 |
| 3,599,433 | 8/1971 | Murata et al. | 523/130 |
| 3,635,877 | 1/1972 | Van Wyk | 523/145 |
| 3,639,658 | 2/1972 | Soldatos | 525/503 |
| 3,696,622 | 10/1972 | Tohma et al. | 523/130 |
| 4,097,443 | 6/1978 | Nakamura et al. | 523/145 |

FOREIGN PATENT DOCUMENTS

| | | |
|---|---|---|
| 1065605 | 9/1959 | Fed. Rep. of Germany . |
| 50-130627 | 10/1975 | Japan ................................. 523/145 |

*Primary Examiner*—Lewis T. Jacobs
*Attorney, Agent, or Firm*—Robbins & Laramie

[57] ABSTRACT

A foundry molding composition comprising,
 (a) a granular refractory material;
 (b) about 0.8 to 5.0% of an alkaline phenolic resin based on the weight of the refractory material;
 (c) about 25 to 110% of a lactone based on the weight of the phenolic resin.

16 Claims, No Drawings

FOUNDRY MOLDING COMPOSITIONS AND PROCESS

BACKGROUND OF THE INVENTION

1. Field of the Invention

This invention relates to foundry molding compositions and, more particularly, to foundry moulding compositions which do not evolve pungent acid gases on thermal decomposition. The invention also comprises a process for the production of foundry moulds and cores using said compositions.

2. The Prior Art

Phenol-formaldehyde (PF), phenol-formaldehyde/-furfuryl alcohol (PF/FA), urea-formaldehyde/furfuryl alcohol (UF/FA) and furfuryl alcohol-formaldehyde condensation products catalysed with strong acid catalysts, such as phosphoric acid, sulphuric acid and para-toluene sulphonic acid and the like, are well known as binders for sand in the production of cold-setting foundry moulds and cores. Aromatic sulphonic acids are more commonly employed than all other types but have the disadvantage that pungent fumes of sulphur dioxide are evolved on thermal decomposition.

UF/FA condensation products contain nitrogen which can form ammonia on thermal decomposition and this tends to neutralize the sulphur dioxide. However, nitrogen in the binder can react with certain metals, such as, for example, grey and nodular irons and steel, resulting in the formation of small bubbles in the final casting, a defect known in the foundry industry as "pinholing". The employment of UF/FA binders is consequently restricted.

Phosphoric acid may be employed as a catalyst but tends to build up on the sand on repeated attrition reclamation and this reduces the refractoriness of the sand. Phosphoric acid is also incompatible with PF/FA condensation products and, as a result, the moulds and cores produced exhibit poor bond strengths.

U.S. Pat. No. 3,599,433 to Murata et al issued on Aug. 17, 1971 describes a system for soil stabilization consisting of a highly alkaline resole cross-linked with lactone. German DAS No. 1065605 to B.A.S.F. shows curing of phenol-formaldehyde condensates with lactones.

SUMMARY OF THE INVENTION

We have now found that the several disadvantages of the foundry binder compositions of the prior art, particularly when alkaline sands are used as the refractory material, can be overcome by employing an alkali-catalysed phenolic resin in conjunction with a lactone as a binder for foundry moulding compositions. Such binders can be free from non-metallic elements other than carbon, hydrogen and oxygen and do not evolve pungent acid fumes during thermal decomposition.

Accordingly, the present invention comprises a foundry moulding composition which comprises a granular refractory material; between about 0.8 and 5.0 percent by weight of an alkaline phenolic resin based on the weight of the refractory; and, as curing agent for the phenolic resin, between about 25 to 110 percent of its weight of a lactone. The composition can include minor quantities of conventional adjuvants used in such compositions. The refractory comprises from about 80 to 99% of the composition and preferably from about 90 to 98% of the composition.

The invention also comprises a process for the production of foundry moulds and cores which comprises mixing refractory granules with from about 0.8 to 5.0 percent by weight of the refractory of an alkaline phenolic binder therefor and from 25 to 110 percent of the weight of the phenolic binder of a lactone and rapidly discharging the mixture so formed to a corebox or pattern mould. Unless otherwise stated all percentages herein are on a weight basis.

DETAILED DESCRIPTION OF THE PREFERRED EMBODIMENTS

The refractory granules employed for the purposes of the present invention may be any of the refractory materials commonly employed in the foundry industry for the production of moulds and cores, such as silica sand, quartz, chromite sand, zircon or olivine sand.

The compositions of the invention have the further advantage that the difficulties commonly associated with the bonding of sands of alkaline reaction, such as olivine and chromite, or beach sands containing shell fragments, and which arise from neutralisation or partial neutralisation of the acid catalyst used, are completely overcome, since the lactone-cured compositions of the invention cure under alkaline conditions.

The compositions of the invention are therefore of particular utility where it is necessary or desirable to employ alkaline sands.

The phenolic binders of the present invention are those based upon phenol or substituted phenols, such as phenol, m-cresol, 3,5-xylen-1-ol and resorcinol, or mixtures thereof and an aldehyde, such as formaldehyde, acetaldehyde and furfuraldehyde. The preferred materials are phenol and formaldehyde, part or all of which may be substituted by paraform.

The molecular ratio of phenol to formaldehyde may be within the range 1:1 to 1:3.0 and will preferably be between 1:1.5 and 1:2.6.

As to the degree of condensation of the phenolic resin, this can most conveniently be described in terms of two parameters, the residual solids on heating at 100° C. to constant weight and the viscosity of the solution. Phenolic resins having solids of between 60 to 95 percent by weight and viscosities within the range 0.5 to 100 poises at 25° C. may be employed. The preferred materials, however, are those with solids of from 80 to 95 percent and a viscosity between 5 and 15 poises.

The proportion of alkaline phenolic resin on the sand can be from 0.8 to 5.0 percent. Preferably, however, the proportion will be between 1.0 and 2.0 percent.

To improve bond strength, it is preferred to add a silane such as, for example, aminopropyltriethoxy silane, as an adhesion promoter, to the compositions of the invention.

The amount of silane employed may vary from 0 to 3 percent of the weight of the resin but is preferably within the range 0.1 to 0.5%.

The preferred alkali is potassium hydroxide and this is preferably added in the form of an aqueous solution of about 50 percent concentration. Other alkaline materials, such as sodium, calcium or magnesium hydroxide, may replace all or part of the potassium hydroxide. The optimum amount of alkali to be added will vary with its nature and concentration. In the case of potassium hydroxide and a phenolic resin with a solids content of about 80 percent, satisfactory results can be obtained with between 15 and 40 percent by weight, based on the weight of resin. The best results are, however, obtained with between 20 and 30 percent.

The lactone may be of any gamma-butyrolactone, caprolactone, propiolactone or valerolactone, or mixtures thereof. The preferred lactone, however, is gamma-butyrolactone. Based on the weight of the resin, the proportion of lactone may be within the range 25 to 110 percent. In the case of gamma-butyrolactone, however, we prefer to use between 40 and 60 percent of the weight of the resin.

The order of mixing the ingredients is not important but we have found that slightly higher strengths are obtained if the lactone is first mixed with the sand and the phenolic resin containing silane then added, followed by a solution of alkali.

Immediately after preparation, the mix is discharged into a corebox or pattern mould and allowed to set. The time required for the moulding mixture prepared in this way to solidify may be varied from 2 minutes to 24 hours but we prefer to adjust the setting rate to give a setting time within the range 5 to 45 minutes.

The following procedures and examples illustrate the invention.

Preparation of Phenol Formaldehyde Resole Resin

In a stainless steel reactor, 42.12 parts by weight of 100% phenol were reacted with 53.7 parts by weight of 50% aqueous formaldehyde solution at a pH of 8.0 obtained by the addition of 1.5% of 32% caustic solution for 3 hours at 80+/−2° C. The temperature was dropped to 50°-55° C. by reducing the pressure in the reactor and water distilled off at this temperature to obtain a viscosity of 400 cST at 25° C. 0.25 parts by weight of gamma aminopropyl triethoxy silane (A.1102 ex Union Carbide) were added slowly and the resin cooled to 40° C. and discharged.

Preparation of Foundry Sand Core Mix

Unless otherwise stated, the following procedure was employed for the examples which follow. 1000 grammes of the selected sand were charged to a Fordath Laboratory coremixer and mixed for 1 minute with 15 grammes of the phenol formaldehyde resin prepared as above. The lactone was then added and mixed for 1 minute. Finally, the alkali was added to the mix and mixed for a further 1 minute. Part of the mix was discharged and rammed into a waxed paper cup which was squeezed by hand to judge when setting occurred. 2"×2" cylinder compression testpieces were prepared to the standard procedure recommended by I.B.F. Working Party P. (All compression cores were made within 3 minutes of discharge of the mix). Compression cores were placed in a standard atmosphere at 20° C. 50% rh and withdrawn at regular intervals up to 24 hours elapsed time for testing for compression strength.

The effect of the order of addition of lactone and resin is particularly shown in Example 2, particularly in comparison with Example 1. Example 1 shows the effects of following the above procedure wherein the lactone is added after mixing the sand with the phenolic, while Example 2 illustrates the effect, using the same formulation, of first adding the lactone to the sand prior to the phenolic resin.

The effect of the type of alkali and its proportions can be seen particularly from the following Examples 3, 4 and 5–7. Example 4 shows that 50 percent caustic soda solution gives higher strengths than 32 percent solution. The setting time can be prolonged by decreasing the proportion added (as can be seen by comparing Examples 3 and 4). By replacing sodium hydroxide by potassium hydroxide longer setting times are obtained but strengths are reduced (Example 5). However, on increasing the proportion of 50 percent potassium hydroxide solution used, higher strengths are obtained (Examples 6 and 7).

The effect of the type of lactone and its proportions can be seen the following Examples, particularly Examples 8, 9 and 16–19. Caprolactone and valerolactone can be used in place of gamma butyrolactone but slower setting times and lower strengths are obtained (Examples 8 and 9). The optimum percentage of lactone appears to be between 30 and 60% of the resin, 45–50% giving the best strengths (Examples 16, 17, 18, 19).

Examples 12, 13 and 14 illustrate that the system sets using alkaline sands, such as Southport sea sand, olivine and zircon, and that usable strengths are obtained.

| EXAMPLE | 1 | 2 | 3 | 4 | 5 | 6 | 7 |
|---|---|---|---|---|---|---|---|
| SAND | | | | | | | |
| Chelford 50 | 400 | 400 | 400 | 400 | 400 | 400 | 400 |
| Olivine | — | — | — | — | — | — | — |
| Southport | — | — | — | — | — | — | — |
| Zircon | — | — | — | — | — | — | — |
| Redhill 65 | — | — | — | — | — | — | — |
| RESIN | 6 | 6 | 6 | 6 | 6 | 6 | 6 |
| LACTONE | | | | | | | |
| Gamma-butyro | 2.8 | 2.8 | 2.8 | 2.8 | 2.8 | 2.8 | 2.8 |
| Capro | — | — | — | — | — | — | — |
| Valero | — | — | — | — | — | — | — |
| ALKALI | | | | | | | |
| 32% NaOH | 2.4 | 2.4 | — | — | — | — | — |
| 50% NaOH | — | — | 2.0 | 1.6 | — | — | — |
| 50% KOH | — | — | — | — | 2.0 | 2.4 | 2.8 |
| SAND TEMPERATURE °C. | 25 | 25 | 22 | 23 | 23 | 24 | 24 |
| BENCH LIFE (MIN) | 5 | 5 | 5 | 6 | 9 | 5 | 4 |
| SET TIME (MIN) | 10 | 9 | 8 | 10 | 14 | 8 | 6 |
| COMPRESSION STRENGTH kN/m2 | | | | | | | |
| after 1 hour | 950 | 1280 | 1100 | 1775 | 950 | 1725 | 2000 |
| after 2 hours | 1050 | 1820 | 2750 | 2550 | 1300 | 2450 | 3200 |
| after 4 hours | 1250 | 2050 | 3400 | 3250 | 1775 | 3350 | 4000 |
| after 24 hours | 3250 | 3750 | 4200 | 3250 | 4100 | 3200 | 5200 |
| AMBIENT CONDITIONS °C. | 24 | 24 | 22 | 22 | 22 | 22 | 22 |
| R.H. | 60 | 60 | 95 | 55 | 53 | 53 | 53 |
| TEST CONDITIONS °C. | 20 | 20 | 20 | 20 | 20 | 20 | 20 |
| R.H. | 50 | 50 | 50 | 50 n | 50 | 50 | 50 |

| EXAMPLE | 8 | 9 | 10 | 11 | 12 | 13 | 14 |
|---|---|---|---|---|---|---|---|
| SAND | | | | | | | |
| Chelford 50 | 400 | 400 | 400 | 400 | — | — | — |
| Olivine | — | — | — | — | 400 | — | — |
| Southport | — | — | — | — | — | 400 | — |
| Zircon | — | — | — | — | — | — | 400 |
| Redhill 65 | — | — | — | — | — | — | — |
| RESIN | 6 | 6 | 6 | 6 | 6 | 6 | 6 |
| LACTONE | | | | | | | |
| Gamma-butyro | — | — | 1.4 | — | 1.4 | 1.4 | 1.4 |
| Capro | 2.8 | — | 1.4 | 2.8 | 1.4 | 1.4 | 1.4 |
| Valero | — | 2.8 | — | — | — | — | — |
| ALKALI | | | | | | | |
| 32% NaOH | 2.4 | — | — | — | — | — | — |
| 50% NaOH | — | — | — | — | — | — | — |
| 50% KOH | — | 3.0 | 2.4 | 2.8 | 2.8 | 2.8 | 2.8 |
| SAND TEMPERATURE °C. | 26 | 23 | 26 | 22 | 23 | 23 | 23 |
| BENCH LIFE (MIN) | 22 | 23 | 8 | 8 | 4 | 7 | 4 |
| SET TIME (MIN) | 36 | 35 | 14 | 13 | 8 | 12 | 6 |
| COMPRESSION STRENGTH kN/m2 | | | | | | | |
| after 1 hour | 650 | 940 | 1185 | 990 | 1750 | 1200 | 4500 |
| after 2 hours | 1825 | 1800 | 1925 | 1925 | 2250 | 2680 | 4500 |
| after 4 hours | 1975 | — | 2565 | 3050 | 2600 | 3150 | — |
| after 24 hours | 3550 | 4700 | 5000 | 4300 | 2600 | 4800 | 10000 |
| AMBIENT CONDITIONS °C. | 26 | 21 | 26 | 25 | 25 | 25 | 25 |
| R.H. | 58 | 59 | 58 | 53 | 53 | 53 | 53 |
| TEST CONDITIONS °C. | 20 | 20 | 20 | 20 | 20 | 20 | 20 |
| R.H. | 50 | 50 | 50 | 50 | 50 | 50 n | 50 |

| EXAMPLE | 15 | 16 | 17 | 18 | 19 | 20 | 21* |
|---|---|---|---|---|---|---|---|
| SAND | | | | | | | |
| Chelford 50 | 400 | 400 | 400 | 400 | 400 | — | 400 |
| Olivine | — | — | — | — | — | — | — |
| Southport | — | — | — | — | — | — | — |
| Zircon | — | — | — | — | — | — | — |
| Redhill 65 | — | — | — | — | — | 400 | — |
| RESIN | 6 | 6 | 6 | 6 | 6 | 6 | 6 |
| LACTONE | | | | | | | |
| Gamma-butyro | 1.0 | 1.1 | 1.2 | 1.3 | 1.4 | 1.4 | 1.4 |
| Capro | 1.0 | 1.1 | 1.2 | 1.3 | 1.4 | 1.4 | 1.4 |
| Valero | — | — | — | — | — | — | — |
| ALKALI | | | | | | | |
| 32% NaOH | — | — | — | — | — | — | 2.4 |
| 50% NaOH | — | — | — | — | — | — | — |
| 50% KOH | 3.0 | 3.0 | 3.0 | 3.0 | 3.0 | 2.8 | — |
| SAND TEMPERATURE °C. | 23 | 23 | 23 | 23 | 23 | 5 | 25 |
| BENCH LIFE (MIN) | 9 | 8 | 7 | 6 | 5 | 7 | 7 |
| SET TIME (MIN) | 14 | 13 | 11 | 9 | 7 | 18 | 10 |
| COMPRESSION STRENGTH kN/m2 | | | | | | | |
| after 1 hour | 1975 | 2370 | 2400 | 2400 | 2300 | 1770 | 990 |
| after 2 hours | 2400 | 3150 | 3250 | 3400 | 3150 | 2760 | 1430 |
| after 4 hours | 2900 | 3750 | 3700 | 3850 | 3900 | 3500 | 1975 |
| after 24 hours | 2900 | 4050 | 4300 | 4850 | 4800 | 5130 | 3900 |
| AMBIENT CONDITIONS °C. | 22 | 22 | 22 | 22 | 22 | 18 | 25 |
| R.H. | 47 | 47 | 47 | 47 | 47 | 65 | 48 |
| TEST CONDITIONS °C. | 20 | 20 | 20 | 20 | 20 | 5 | 20 |
| R.H. | 50 | 50 | 50 | 50 | 50 | 72 | 50 |

REMARKS:
*Resin and alkali premixed

We claim:

1. A foundry moulding composition comprising:
   (a) a granular refractory material;
   (b) about 0.8 to 5.0% of an alkaline phenolic resin based on the weight of the refractory material;
   (c) about 25 to 110% of a lactone based on the weight of the penolic resin, said composition is capable of setting at ambient temperatures.

2. The composition of claim 1 wherein the refractory material is a sand having an alkaline reaction.

3. The composition of claim 2 wherein the sand is olivine, chromite, or beach sands containing shell fragments.

4. The composition of claim 1 wherein the phenolic resin is the reaction product of phenol, m-cresol, 3,5-xylen-1-ol, resorcinol or mixtures thereof and an aldehyde selected from the group consisting of formaldehyde, acetaldehyde or furfuraldehyde.

5. The composition of claim 4 wherein the phenolic resin is that of phenol and formaldehyde.

6. The composition of claim 5 wherein the ratio of phenol to formaldehyde is from about 1:1.0 to 1:3.0.

7. The composition of claim 6 wherein the ratio of phenol to formaldehyde is from about 1:1.5 to 1:2.6.

8. The composition of claim 1 wherein the phenolic resin has a solids content of between 60 to 95% and a viscosity of about 0.5 to 100 poises at 25° C.

9. A composition of claim 8 wherein the said solids content of the phenolic is from about 80 to 95% and the viscosity is between about 5 to 15 poises at 25° C.

10. A composition of claim 1 which includes from about 0.1 to 3% of a silane having adhesion promoter properties between said resin and said refractory.

11. A process for the production of foundry moulds and cores which comprises mixing:
(a) refractory granules with;
(b) about 0.8 to 5.0% of an alkaline phenolic binder based on the weight of the refractory material;
(c) about 25 to 110% of a lactone based on the weight of the said binder; and
(d) rapidly discharging the mixture so formed into a corebox or pattern mold, said mixture is capable of setting at ambient temperatures.

12. A process of claim 11 wherein the mixture has a pH above 7.6 and a minor quantity of a silane adhesion promotor is added to the mixture prior to discharge into a corebox or pattern mold.

13. A process of claim 11 wherein the refractory granules are a sand having an alkaline reaction.

14. The process of claim 11 wherein the lactone is mixed first with the said refractory granules, and then the said phenolic binder is mixed with said granules, prior to discharge of the mixture into a corebox or pattern mold.

15. The process of claim 11, 12, 13 or 14 comprising adding a small amount of a concentrated solution of an alkali metal hydroxide to said mixture before discharging the mixture into a corebox or pattern mold.

16. A process for the production of foundry molds and cores which comprises the following steps:
mixing together particles of a sand that has an alkaline reaction and gamma-butyrolactone, then
mixing therewith an alkali-catalyzed phenol-formaldehyde resin binder in an amount from about 1% to about 2% of the binder by weight based on the sand,
the amount of said lactone being in the range from about 40% to about 60% by weight based on the said phenolic binder, then
mixing therewith a small amount of a concentrated aqueous solution of an alkali metal hydroxide, before discharging the mixture, and then
rapidly thereafter discharging the mixture so formed into a corebox or pattern mold.

* * * * *

UNITED STATES PATENT AND TRADEMARK OFFICE
CERTIFICATE OF CORRECTION

PATENT NO. : 4,426,467

DATED : January 17, 1984

INVENTOR(S) : Ingmar P. QUIST, Jeffrey D. RAILTON, and Peter H.R.B. LEMON

It is certified that error appears in the above-identified patent and that said Letters Patent is hereby corrected as shown below:

Col. 5, claim 1 should read as follows:

1. A foundry moulding composition comprising:
(a) a granular refractory material;
(b) about 0.8 to 5.0% of an alkaline phenolic resin based on the weight of the refractory material;
(c) about 25 to 110% of a lactone based on the weight of the phenolic resin,
wherein said composition is capable of setting at ambient temperatures.

Col. 7, claim 11 should read as follows:

11. A process for the production of foundry moulds and cores which comprises mixing:
(a) refractory granules with;
(b) about 0.8 to 5.0% of an alkaline phenolic binder based on the weight of the refractory material;
(c) about 25 to 110% of a lactone based on the weight of the said binder; and
(d) rapidly discharging the mixture so formed into a corebox or pattern mold,
wherein said mixture is capable of setting at ambient temperatures.

Signed and Sealed this

Fourteenth Day of May 1985

[SEAL]

Attest:

DONALD J. QUIGG

Attesting Officer   Acting Commissioner of Patents and Trademarks